(12) United States Patent
Achtermann et al.

(10) Patent No.: US 8,086,970 B2
(45) Date of Patent: Dec. 27, 2011

(54) ADDRESS RANGE VIEWER

(75) Inventors: Jeffrey Mark Achtermann, Austin, TX (US); Eric Norman Azares, Cary, NC (US); Denise Ann Bell, Austin, TX (US); Victor Gee Yiu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 11/832,767

(22) Filed: Aug. 2, 2007

(65) Prior Publication Data
US 2009/0037847 A1 Feb. 5, 2009

(51) Int. Cl.
*G06F 3/048* (2006.01)
*G06F 3/00* (2006.01)

(52) U.S. Cl. ......... 715/833; 715/739; 715/828; 715/854

(58) Field of Classification Search .......... 715/734–736, 715/738–739, 825, 833, 854–856, 828; 345/440
See application file for complete search history.

(56) References Cited

U.S. PATENT DOCUMENTS

| | | | | |
|---|---|---|---|---|
| 5,615,347 | A * | 3/1997 | Davis et al. | 715/833 |
| 6,614,456 | B1 * | 9/2003 | Rzepkowski et al. | 715/833 |
| 6,834,298 | B1 | 12/2004 | Singer et al. | |
| 7,199,796 | B2 * | 4/2007 | Bennett et al. | 345/440.1 |
| 2005/0018683 | A1 | 1/2005 | Zhao et al. | |
| 2005/0154762 | A1 | 7/2005 | Wang | |
| 2006/0018325 | A1 * | 1/2006 | Conrad | 370/395.52 |
| 2006/0288296 | A1 | 12/2006 | Rosenbluth et al. | |

OTHER PUBLICATIONS

McPherson et al., "PortVis: A Tool for Port-Based Detection of Security Events", VizSEC/DMSEC'04, Oct. 29, 2004, Washington DC, USA, Copyright 2004 ACM.*
Kim et al., "Real-Time Visualization of Network Attacks on High-Speed Links", IEEE Network, Sep./Oct. 2004, Copyright 2004 IEEE.*
"The Men & Mice Suite—Managing the IP address infrastructure", Men & Mice, White Paper, Oct. 2006, pp. 1-15.
Itoh et al., "Hierarchical Visualization of Network Intrusion Detection Data in the IP Address Space", http://www.is.ocha.ac.jp/~itot/paper/ItotRJPE14.pdf, pp. 1-18, Apr. 2006.
Yurcik et al., "A Prototype Tool for visual Data Mining of Network Traffic for Intrusion Detection", National Center for Supercomputing Applications, 2003, pp. 1-9. http://www.ncsa.uiuc.edu/People/jbarlow/publications/ICDM-DMSEC03.pdf.

* cited by examiner

*Primary Examiner* — William L Bashore
*Assistant Examiner* — Andrew Tank
(74) *Attorney, Agent, or Firm* — Yee & Associates, P.C.; Jeffrey S. LaBaw

(57) ABSTRACT

The exemplary embodiments provide a computer implemented method, apparatus, and computer usable program code for a graphical user interface for managing a plurality of internet protocol ranges. A plurality of internet protocol ranges are displayed in a control area. A user selects either a one-dimensional or a two-dimensional graphical representation of a portion of the plurality of internet protocol ranges. A visual representation of the internet address space of the plurality of internet protocol ranges is generated in a view manipulation component. A graphic display component displays the selected graphical representation of the portion of the plurality of internet protocol range.

15 Claims, 6 Drawing Sheets

ADDRESS RANGE VIEWER

BACKGROUND OF THE INVENTION

1. Field of the Invention

The present invention relates generally to data management. More specifically, exemplary embodiments provide a method, computer useable program code and a system for managing internet protocol ranges.

2. Description of the Related Art

An internet protocol (IP) range consists of an upper bound and lower bound internet protocol address. An internet protocol version four (IPv4) address, henceforth referred to as an internet protocol address, consists of four parts of eight bits each, typically separated with a period ("."). Each part of eight bits is called an octet. An example of an internet protocol address is 192.168.0.1. The internet protocol address space included in those respective bounds will be henceforth called an internet protocol range. An internet protocol range comprises a plurality of internet protocol addresses. For example, 10.0.0.1-10.0.5.254 expresses an internet protocol range.

Currently, no graphical viewers exist to help systems management administrators visualize the internet protocol ranges that the systems management administrators are responsible for managing. Editing lists of internet protocol ranges is performed through an interface that presents the internet protocol ranges in a numeric-based, tabular-format only. This format does not help the administrator easily notice gaps or overlaps in the range definitions.

Systems management administrators manage lists of known internet protocol ranges in order to specify characteristics pertinent to each internet protocol range and to associate each internet protocol range with a larger region. Typically, internet protocol ranges are entirely managed in a tabular structure; each row specifies an internet protocol range, with buttons allowing row operations of add/edit/delete. This method is not user friendly and is programmer-centric, as sometimes internet protocol range definitions spill over several pages.

SUMMARY OF THE INVENTION

The exemplary embodiments provide a computer implemented method, apparatus, and computer usable program code for a graphical user interface for managing a plurality of internet protocol ranges. A plurality of internet protocol ranges are displayed in a control area. A user selects either a one-dimensional or a two-dimensional graphical representation of a portion of the plurality of internet protocol ranges. A visual representation of the internet address space of the plurality of internet protocol ranges is generated in a view manipulation component. A graphic display component displays the selected graphical representation of the portion of the plurality of internet protocol range.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
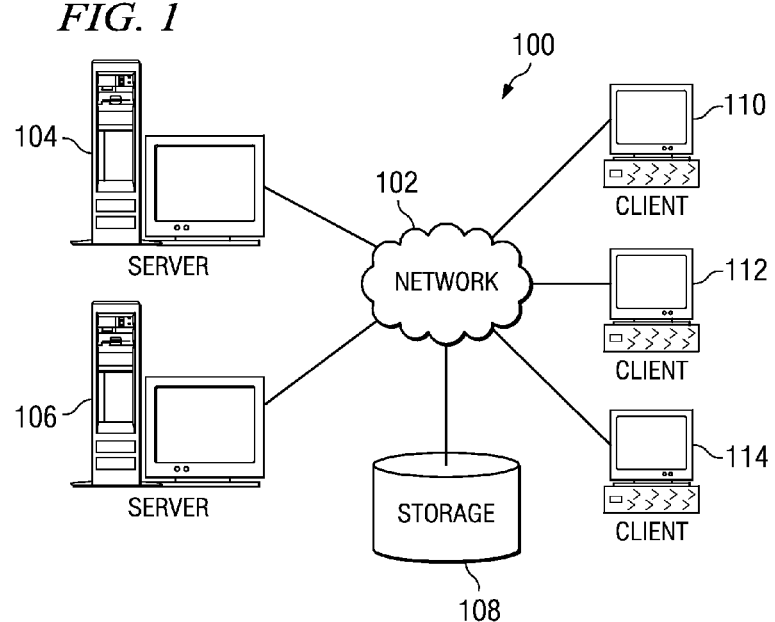
FIG. 1 depicts a pictorial representation of a network of data processing systems in which illustrative embodiments may be implemented.
Figure 2:
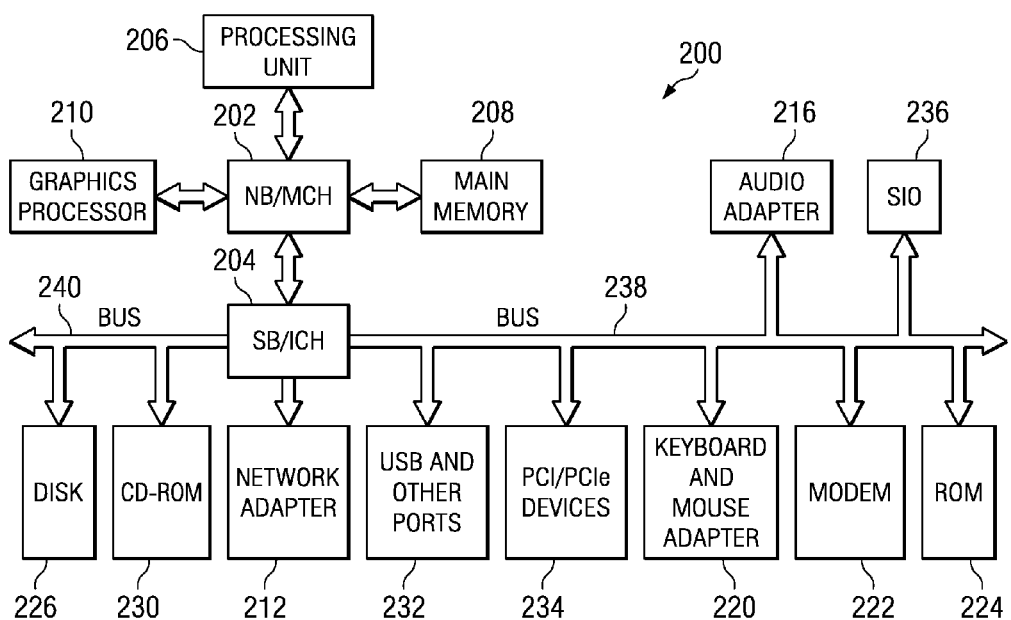
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary, and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system, and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
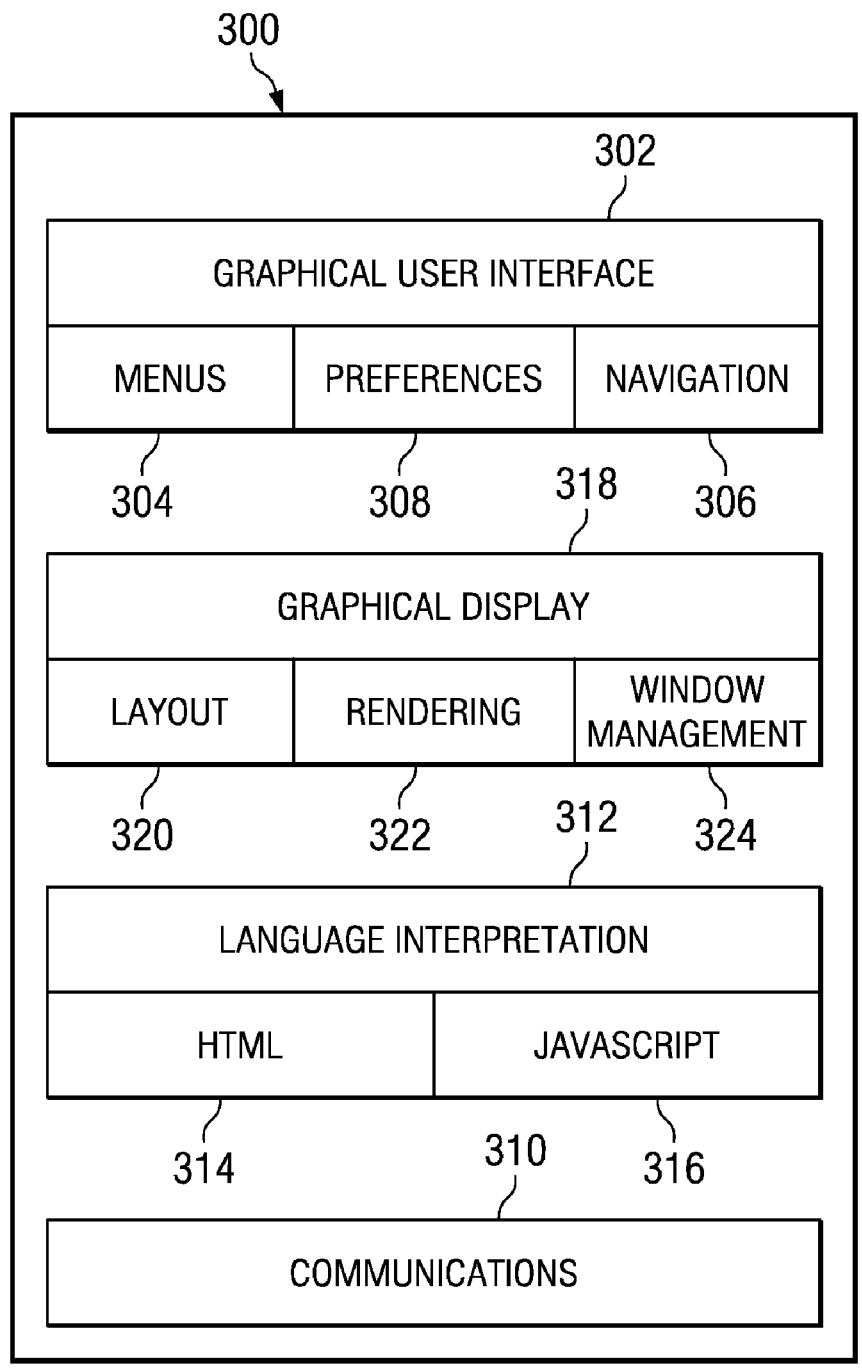
FIG. 3 is a block diagram of a browser program.

Turning next to FIG. 3, a block diagram of a browser program is depicted. A browser is an application used to navigate or view information or data in a distributed database, such as the Internet or the World Wide Web.

In this example, browser 300 includes graphical user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communications 310 uses hypertext transfer protocol (HTTP). Other protocols may be used depending on the implementation. Documents that are received by browser 300 are processed by language interpretation 312, which includes HTML 314 and JavaScript 316. Language interpretation 312 will process a document for presentation on graphical display 318. In particular, HTML statements are processed by HTML 314 for presentation while JavaScript statements are processed by JavaScript unit 316.

Graphical display 318 includes layout 320, rendering 322, and window management 324. These units are involved in presenting web pages to a user based on results from language interpretation 312.

Browser 300 is presented as an example of a browser program in which illustrative embodiment may be embodied. Browser 300 is not meant to imply architectural limitations. Presently available browsers may include additional functions not shown or may omit functions shown in browser 300. A browser may be any application that is used to search for and display content on a distributed data processing system. Browser 300 may be implemented using known browser applications, such as Netscape Navigator™ or Microsoft Internet Explorer™. Netscape Navigator™ is available from Netscape Communications Corporation while Microsoft Internet Explorer™ is available from Microsoft Corporation.

Exemplary embodiments provide an administrator with simple, at-a-glance management of defined and undefined internet protocol ranges through graphical visualization. An internet protocol range consists of a plurality of internet protocol addresses. A range of octets comprises a plurality of octets. Exemplary embodiments provide an editor or viewer that an administrator can use to edit and identify internet protocol ranges using drag and drop techniques, by typing numeric range directly, and by specifying numeric ranges with interactive slider controls.

Other exemplary embodiments provide for color-coding specified internet protocol ranges. The color-coding can be determined by the user or chosen automatically by the software. Furthermore, alternate exemplary embodiments allow an administrator to review all of the internet protocol ranges under the control of the administrator on a one-dimensional line or a two-dimensional plane. Exemplary embodiments allow a user to view numeric ranges by locking one or more of the top-level octets of the internet protocol range. Locking an octet means to fix a particular octet to a specific value. Additionally, exemplary embodiments allow a user to zoom in and out of this view by focusing on a specific internet protocol range.

All these modes of visualization and interaction allow the administrator to manage his or her network definitions much more logically and conveniently, rather than merely with a traditional list and entry form.

Exemplary embodiments provide a graphical interface that allows users to manage internet protocol ranges. The graphical interface may be implemented in a variety of embodiments, depending upon the specific implementation. For example, the interface may be implemented as, but is not limited to, a client side application, a server-rendered Hyper Text Mark-up Language document(s) through a web browser, or a combination of both. Hyper Text Mark-Up Language (HTML) is a subset of the Standard Generalized Mark-Up Language (SGML) for electronic publishing, the specific standard used for the World Wide Web.

Exemplary embodiments are not limited to a one-dimensional view. A two-dimensional view could match up the two axes with two neighboring octets of an internet protocol address range. Alternate embodiments also include a user control, such as a check box, or option to show the internet protocol addresses in hex or in decimal formats. An example of an internet protocol address in hex form is 1E.34.35.A9. An example of an internet protocol address in decimal form is 192.168.0.1.

Exemplary embodiments provide the user with the ability to zoom in the 32-bit internet protocol space and see which internet protocol addresses are grouped by internet protocol ranges. Internet protocol ranges may represent, for example, but are not limited to, systems that are being used, systems that share similar properties or characteristics, or systems that belong in a logical grouping, and so forth. Alternate embodiments allow for color-coding, pattern coding, or a status indication to show internet protocol addresses that are experiencing a problem or error. The internet protocol range displayed may be, for example, but is not limited to, manipulated by dragging and dropping the boundaries of the internet protocol range, clicked on for editing the properties of the internet protocol range, or hovered over by a mouse or pointing device to display additional information and properties.

Exemplary embodiments provide for a graphical user interface that allows users to manage internet protocol ranges comprising an internet protocol range view, a view manipulation area and a graphical area for internet protocol range visualization. Alternate exemplary embodiments present the internet protocol range view in either a tabular view form or a tree view form.

In the tabular view of internet protocol ranges, a user can select one or more rows through use of a check box. The user can choose to take the actions of create, edit, delete, and visualize internet protocol range, through a drop down menu. The selected row or rows are then transferred to the view manipulation area and/or the graphical area for internet protocol range visualization, as appropriate.

Figure 4:
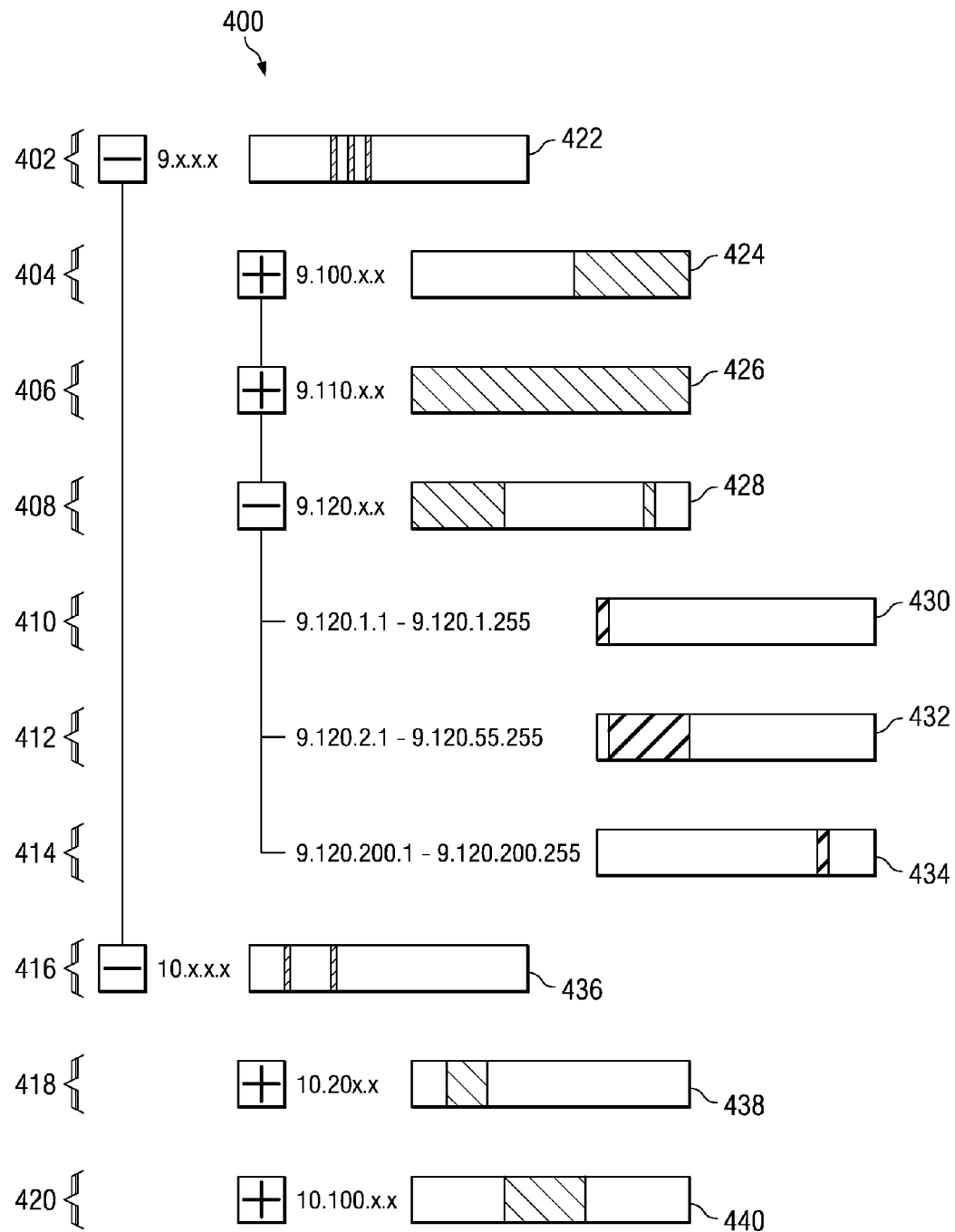
FIG. 4 illustrates a tree view of internet protocol ranges in accordance with an exemplary embodiment.

In a tree view of internet protocol ranges, a user is presented with a list of internet protocol ranges, ordered hierarchically according to the initial octet of the internet protocol range. The tree is expandable/collapsible. Each level of the tree contains a preview of the internet protocol spaces encapsulated with the internet protocol range. FIG. 4 depicts an example of such a tree view of internet protocol ranges.

Returning to the figures, FIG. 4 illustrates a tree view of internet protocol ranges in accordance with an exemplary embodiment. Graphical user interface 400 presents a tree view of an internet protocol range. The internet protocol ranges are arranged hierarchically according to the initial octet. Thus, in the present exemplary embodiment, there are two primary branches of the tree shown in graphical user interface 400, branches 402 and 416, both of which have been expanded, as indicated by the minus (−) symbol that precedes the expressed internet protocol range. A minus symbol indicates that the branch is expanded and can be collapsed by clicking on the minus symbol. A branch that is not expanded in the current view but is capable of being expanded is preceded by a plus (+) symbol. A branch that has been expanded as far as it can be expanded is not preceded by any symbol.

Branch 402 represents a plurality of internet protocol addresses matching the pattern 9.x.x.x, where x represents any allowable octet. Viewport 422 provides a visual preview of the allocation of internet protocol addresses managed by one or more internet protocol ranges matching the pattern 9.x.x.x. The internet protocol range displayed in a viewport, such as viewport 422, may be, for example, but is not limited to, manipulated by dragging and dropping the boundaries of the internet protocol range, clicked on for editing the properties of the internet protocol range, or hovered over by a mouse or pointing device to display additional information and properties.

Branch 402 has been expanded to show sub-branches 404, 406 and 408. The plus sign preceding both sub-branches 404 and 406 indicates that sub-branches 404 and 406 are currently collapsed but are capable of being expanded.

Sub-branch 404 represents internet protocol addresses matching the pattern 9.100.x.x. Viewport 424 provides a visual preview of the allocation of internet protocol addresses matching the pattern 9.100.x.x. Sub-branch 406 represents internet protocol addresses matching the pattern 9.110.x.x. Viewport 426 provides a visual preview of the allocation of internet protocol addresses matching the pattern 9.110.x.x. Sub-branch 408 represents internet protocol addresses matching the pattern 9.120.x.x. Viewport 428 provides a visual preview of the allocation of internet protocol addresses matching the pattern 9.120.x.x.

As indicated by the minus sign preceding sub-branch 408, sub-branch 408 has been further expanded to show sub-branches 410, 412, and 414. Sub-branches 410, 412 and 414 cannot be further expanded or contracted, as indicated by the lack of any symbol preceding sub-branches 410, 412 and 414. Sub-branch 410 represents internet protocol range 9.120.1.1 to 9.120.1.255. Viewport 430 provides a visual preview of the allocation of internet protocol range 9.120.1.1 to 9.120.1.255.

Sub-branch 412 represents internet protocol range 9.120.2.1 to 9.120.55.255. Viewport 432 provides a visual preview of the allocation of internet protocol range 9.120.2.1 to 9.120.55.255. Sub-branch 414 represents internet protocol range 9.120.200.1 to 9.120.200.255. Viewport 434 provides a visual preview of the allocation of internet protocol range 9.120.200.1 to 9.120.200.255.

Branch 416 represents internet protocol addresses matching the pattern 10.x.x.x. Viewport 436 provides a visual preview of the allocation of internet protocol addresses matching the pattern 10.x.x.x. Branch 416 has been expanded to show sub-branches 418 and 420. The plus sign preceding both sub-branches 418 and 420 indicates that sub-branches 418 and 420 are currently collapsed but are capable of being expanded. Sub-branch 418 represents internet protocol addresses matching the pattern 10.20.x.x. Viewport 438 provides a visual preview of the allocation of internet protocol addresses matching the pattern 10.20.x.x. Sub-branch 420 represents internet protocol addresses matching the pattern 10.100.x.x. Viewport 440 provides a visual preview of the allocation of internet protocol addresses matching the pattern 10.100.x.x.

Figure 5:
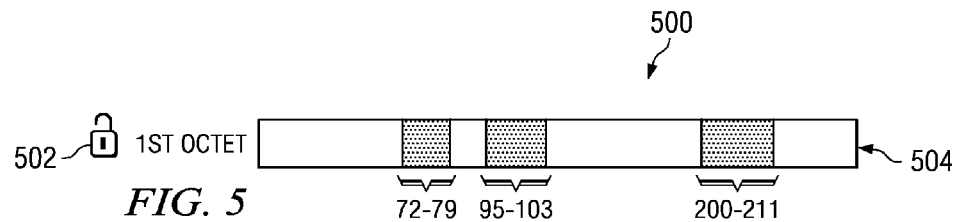
FIG. 5 depicts a view of the overall internet protocol address space in accordance with an exemplary embodiment.

FIG. 5 depicts a view of the overall internet protocol address space in accordance with an exemplary embodiment. Graphical user interface 500 shows a top octet level view of the entire internet protocol address space. The view manipulation area of a graphical interface allows users to manage internet protocol ranges, in accordance an exemplary embodiment. Lock symbol 502 indicates that the first octet is unlocked. The shaded portions of viewport 504 indicate that internet protocol addresses within the internet protocol ranges defined as 72.0.0.1-79.255.255.255, 95.0.0.1-103.255.255.255, and 200.0.0.1-211.255.255.255 are allocated. Selecting one of these areas allows a user to view and optionally edit properties associated with that particular internet protocol range definition.

When a user locks the top octet using lock button 502, the user may choose the top octet to focus on and view the next level octet, the second level, showing which internet protocol ranges are defined for that level. In an exemplary embodiment, focusing on and viewing a next level octet is provided by a slider bar. Additionally, a direct value can be directly entered into the text field adjacent to the slider. The viewport below the slider, which represents the next level of internet protocol ranges, changes dynamically as the slider is moved along the bar. Once a user has decided on a specific first octet that the user wishes to investigate or view in more detail, the user may lock the first octet, causing the viewport for the second octet to be updated and displayed to the user.

Figure 6:
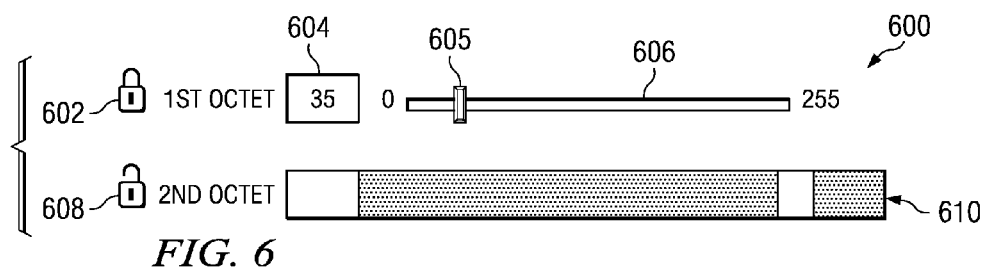
FIG. 6 depicts a view of a second octet of an internet protocol space in accordance with an exemplary embodiment.

FIG. 6 depicts a view of a second octet of the internet protocol address space in accordance with an exemplary embodiment. Graphical user interface 600 shows a view of a second level of an internet protocol address space, as shown in a view manipulation area, in accordance an exemplary embodiment. Lock symbol 602 indicates that the first octet is locked. In the present exemplary embodiment, the first octet is locked on octet 35, as shown by first octet text field 604. A direct value can also be directly entered into text field 604. Lock symbol 608 indicates that the second octet is not locked.

Slider bar 606 represents valid values, from 0 to 255, of the first octet. As a user moves slider 605 along slider bar 606, viewport 610 changes dynamically to show the allocation of internet protocol addresses (internet protocol ranges) corresponding with the position of slider 605, currently set to show all internet protocol addresses that start with the octets 35. Once a user has decided on a specific second octet that the user wishes to investigate or view in more detail, the user may lock the second octet, causing the viewport for the third octet to be updated and displayed to the user.

Figure 7:
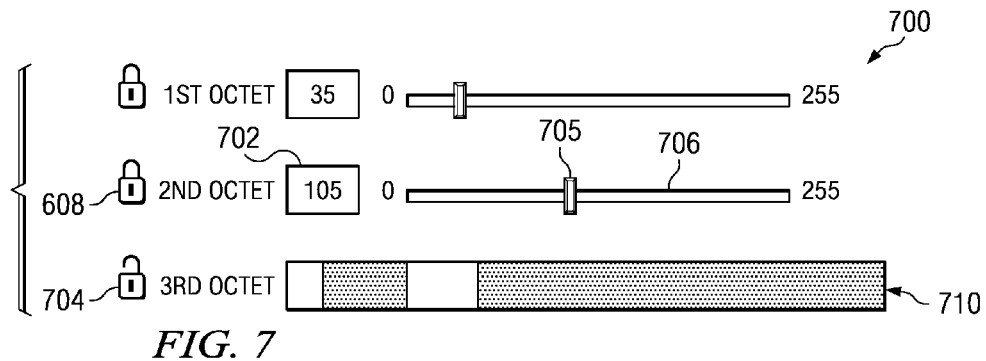
FIG. 7 depicts a view of a third octet of an internet protocol space in accordance with an exemplary embodiment.

FIG. 7 depicts a view of a third octet of the internet protocol address space in accordance with an exemplary embodiment. Graphical user interface 700 shows a view of a third level of an internet protocol address space, as shown in a view manipulation area, in accordance an exemplary embodiment. FIG. 7 shows FIG. 6 after a user has locked the second octet, as indicated by lock symbol 608. In the present exemplary embodiment, the second octet is locked on octet 105, as shown by second octet text field 702. Lock symbol 704 indicates that the third octet is not locked.

Slider bar 706 represents valid values, from 0 to 255, of the second octet. As a user moves slider 705 along slider bar 706, viewport 710 changes dynamically to show the allocation of internet protocol addresses (internet protocol ranges) corresponding with the position of slider 705, currently set to show all internet protocol addresses that start with the octets 35.105. Once a user has decided on a specific third octet that the user wishes to investigate or view in more detail, the user may lock the third octet, causing the viewport for the fourth octet to be updated and displayed to the user.

Figure 8:
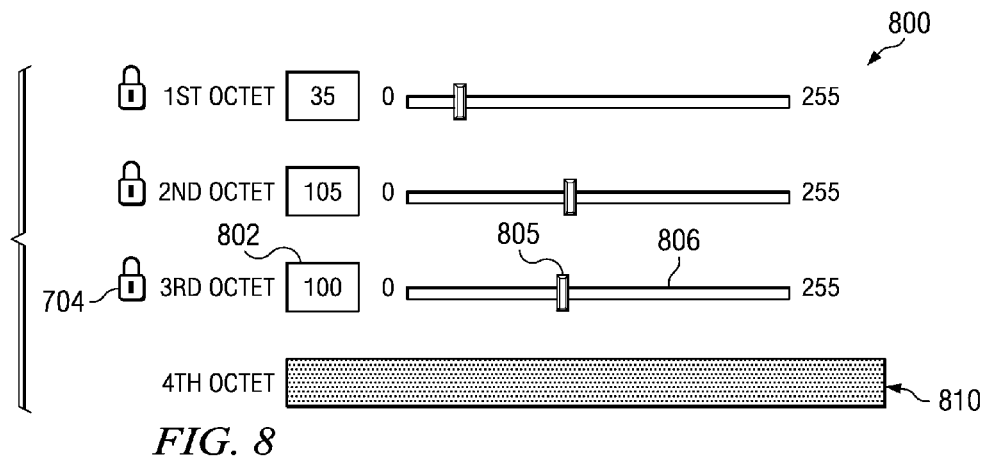
FIG. 8 depicts a view of a fourth octet of an internet protocol space in accordance with an exemplary embodiment.

FIG. 8 depicts a view of a fourth octet of an internet protocol address space in accordance with an exemplary embodiment. Graphical user interface 800 shows a view of a fourth level of an internet protocol address space, as shown in a view manipulation area, in accordance an exemplary embodiment. FIG. 8 shows FIG. 7 after a user has locked the third octet, as indicated by lock symbol 704. In the present exemplary embodiment, the third octet is locked on octet 100, as shown by third octet text field 802.

Slider bar 806 represents the valid values, from 0 to 255, of the third octet. As a user moves slider 805 along slider bar 806, viewport 810 changes dynamically to show the allocation of internet protocol addresses (internet protocol ranges) corresponding with the position of slider 805, currently set to show all internet protocol addresses that start with the octets 35.105.100.

In alternate embodiments, internet protocol ranges are displayed in viewport 810 utilizing different colors to indicate different classifications, statuses, or properties of an internet protocol range. For example, a particular color indicates that the address is currently active and working normally, a second color indicates that the address is not functioning properly, a third color indicates that an error has been encountered, and so forth.

Further alternate embodiments apply this color scheme to each level of the octet viewing and viewports. Thus, a user may view a particular range highlighted in a color, say red for example, that indicates a problem in the global octet view and then be able to trace the problem down to the specific lower-level octet where the problem is occurring. For example, in some instances a whole range of internet protocol addresses may be experiencing a problem or be non-functioning, as indicated by a range within the first, second or third octets, visually indicating the problem.

Figure 9:
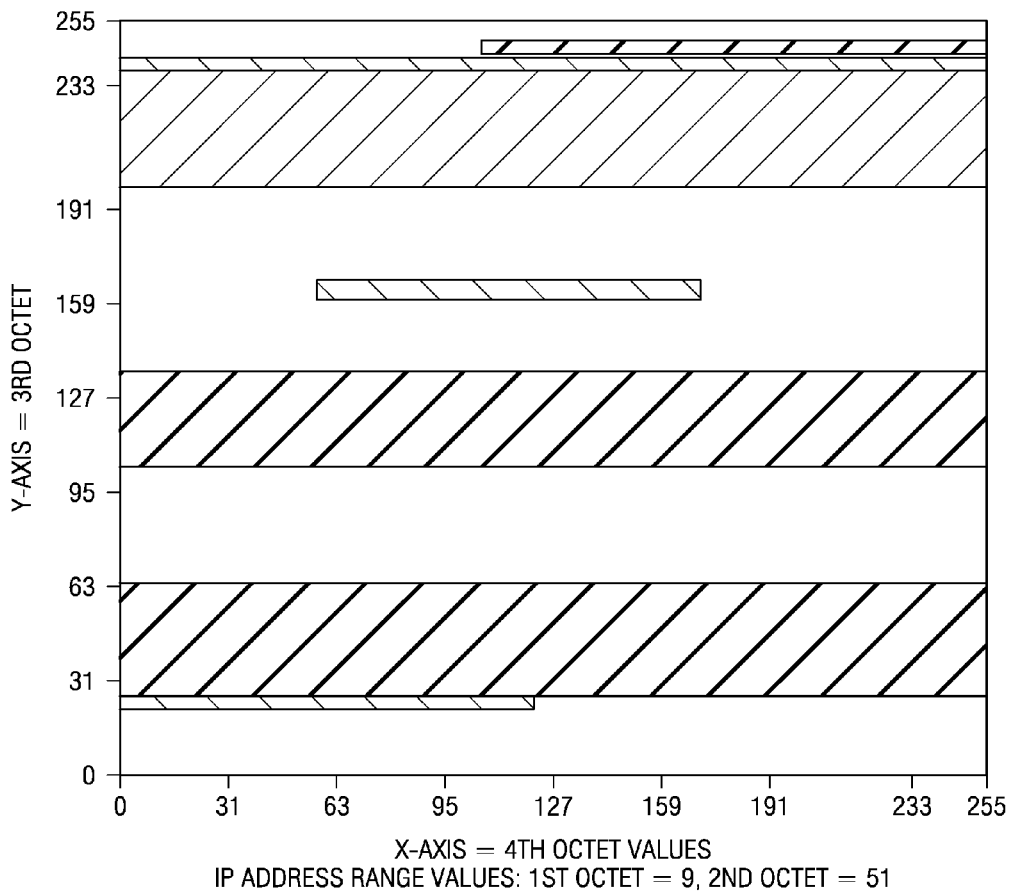
FIG. 9 is a two-dimensional view of internet protocol range address octets in accordance with an exemplary embodiment.

FIG. 9 is a two-dimensional view of internet protocol range address octets in accordance with an exemplary embodiment. Graph 900 is an x-y graph showing two octets out of the four octets that make up an internet protocol address. Both the x-axis and the y-axis of graph 900 range from 0 to 255. Graph 900 can depict any two consecutive octets in an internet protocol address range. Thus, a graph such as graph 900 may show the first and second octet mapped against each other, the second and third octets mapped against each other or the third and fourth octets mapped against each other. In the present exemplary embodiment, the y-axis of graph 900 represents the third octet of an internet protocol address and the x-axis represents the fourth octet of an address range. In the present example, the first octet is 9 and the second octet is 51. Thus, graph 900 represents a two-dimensional view of the allocation of the entire range of the third and fourth octets, from 0 to 255, of all internet protocol addresses that start with 9.51.

Figure 10:
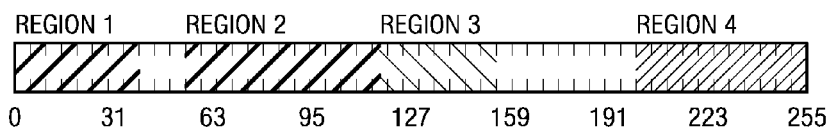
FIG. 10 illustrates an alternative one-dimensional view of an internet protocol address space in accordance with an alternate embodiment.

FIG. 10 illustrates an alternate one-dimensional view of an internet protocol address space in accordance with an alternate embodiment. Viewport 1000 is an alternate embodiment of a viewport such as viewports 504, 610, 710, and 810 in FIGS. 5, 6, 7, and 8, respectively. Viewport 1000 displays a one-dimensional view of internet protocol ranges within a specific internet protocol address space. The numbers, 0 through 255, indicate one octet of the internet protocol address space. Various internet protocol ranges, which indicate related or commonly managed internet protocol addresses, may be shown by different colors or patterns. Exemplary embodiments allow a user to click or drag viewport 1000 to expand or contract the internet protocol range boundaries. Further, when a pointer, such as mouse, hovers over viewport 1000 additional details about the internet protocol range are provided. Additionally, a user may click on viewport 1000 to edit properties of the internet protocol range.

Figure 11:
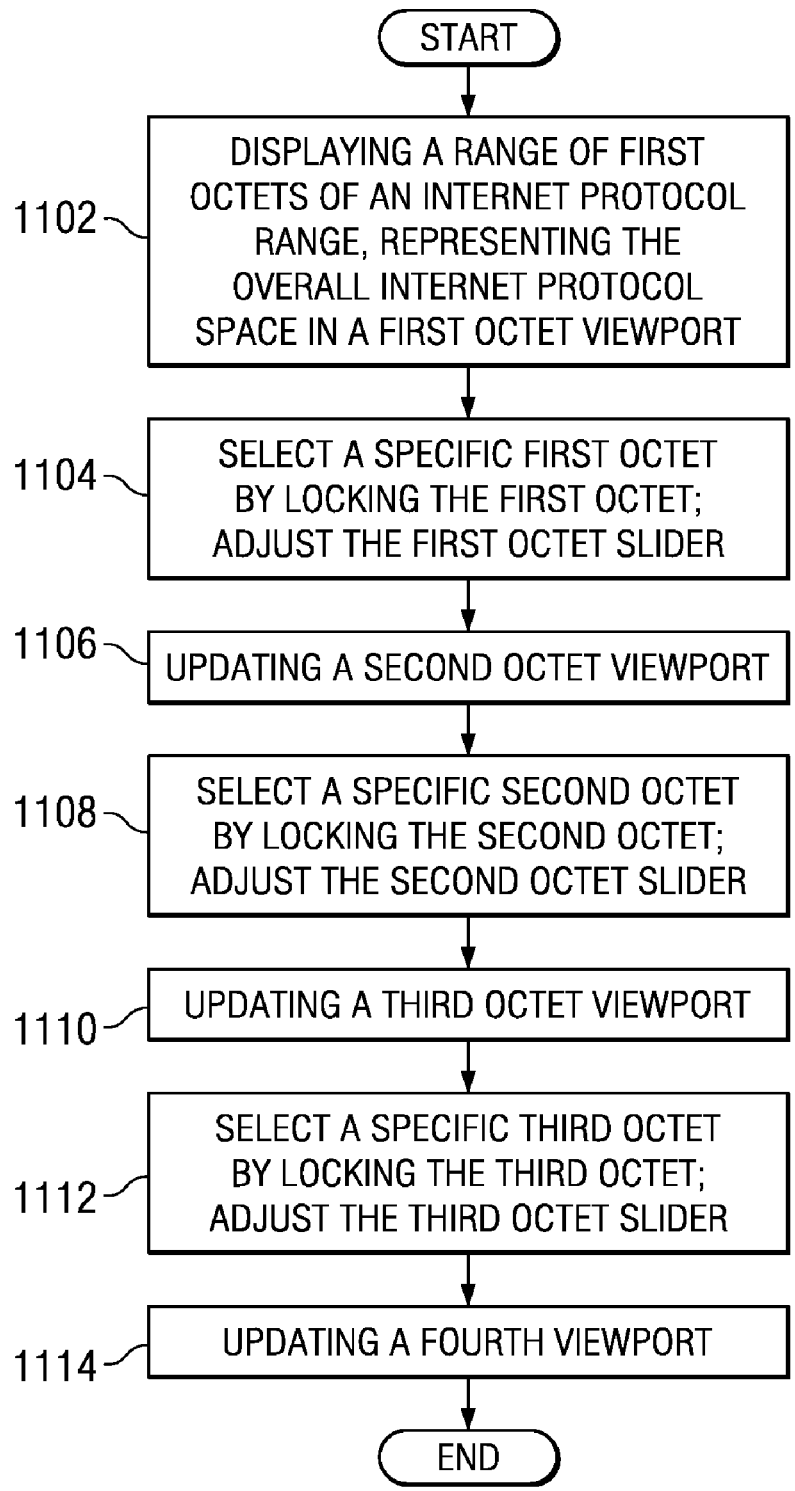
FIG. 11 is flowchart illustrating the operation of viewing and altering an address range in accordance with an exemplary embodiment.

FIG. 11 is flowchart illustrating the operation of viewing and altering an internet protocol address range in accordance with an exemplary embodiment. The operation of FIG. 11 may be implemented in a data processing system such as data processing system 200 in FIG. 2 or browser 300 in FIG. 3. The operation begins when a range of first octets of an internet protocol range, representing the overall internet protocol space, is displayed in a first octet viewport (step 1102). The user selects a specific first octet by locking the first octet; adjusts the first octet slider (step 1104). The second octet viewport updates, reflecting defined internet protocol ranges and or the characteristics of the defined internet protocol range (step 1106). The user selects a specific second octet by locking the second octet; adjusts the second octet slider (step 1108). The third octet viewport updates, reflecting defined internet protocol ranges and or the characteristics of the defined internet protocol range (step 1110). The user selects a specific third octet by locking the third octet; adjusts the third octet slider (step 1112). The fourth viewport updates, reflecting defined internet protocol ranges and or the characteristics of the defined internet protocol range (step 1114) and the operation ends. The internet protocol range displayed in a viewport may be, for example, but not limited to, manipulated by dragging and dropping the boundaries of the internet protocol range, clicked on for editing the properties of the internet protocol range, or hovered over by a mouse or pointing device to display additional information and properties.

Thus, various exemplary embodiments provide the user with the ability to zoom in to a specific set of internet protocol addresses and see which internet protocol addresses are being used or are assigned to a system. Alternate embodiments allow for color-coding, pattern coding, or a status indication to show internet protocol addresses that are experiencing a problem or error.

Further exemplary embodiments provide for a graphical user interface that allows users to manage internet protocol ranges comprising an internet protocol range view, a view manipulation area and a graphical area for internet protocol range visualization. Alternate exemplary embodiments present the internet protocol range view in either a tabular view form or a tree view form.

The invention can take the form of an entirely hardware embodiment, an entirely software embodiment or an embodiment containing both hardware and software elements.

In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A graphical user interface for managing a plurality of internet protocol ranges, the graphical user interface comprising:

a control component for displaying, by a processing unit, the plurality of internet protocol ranges;

a selector for selecting either a one-dimensional or a two-dimensional graphical representation of a portion of the plurality of internet protocol ranges to form a selected graphical representation, wherein the graphical representation of the portion of the plurality internet protocol ranges is an enlarged version of the visual representation of the internet address space of the plurality of internet protocol ranges for providing additional details to a user;

a view manipulation component for providing a visual representation of an internet address space of the plurality of internet protocol ranges, wherein the view manipulation component comprises:
  a plurality of octet view areas and an octet slider bar for each of a first three octet view areas; and
  a locking selector for locking the each of the first three octet view areas to a specific octet, wherein the octet slider bar is generated responsive to the specific octet being locked, and wherein the each of the first three octet view areas is removed from the view manipulation component responsive to the specific octet being locked; and
a graphical component for displaying the selected graphical representation of the portion of the plurality of internet protocol ranges.

2. The graphical user interface of claim 1, wherein the control component displays the plurality of internet protocol ranges in a tree form.

3. The graphical user interface of claim 1, wherein the graphical representation of the portion of the plurality of internet protocol ranges is an x-y graph.

4. The graphical user interface of claim 1, wherein the view manipulation component allows a user to alter a definition of an internet protocol range of the plurality of internet protocol ranges by a drag and drop method.

5. The graphical user interface of claim 1, wherein the view manipulation component is a view manipulation area, and wherein the view manipulation area allows a user to edit properties of an internet protocol range of the plurality of internet protocol ranges by clicking on the view manipulation area with a pointing device.

6. The graphical user interface of claim 1, wherein moving a first slider along a first octet slider bar causes a second octet view area in the plurality of octet view areas to change in correspondence to a first octet indicated by the first octet slider bar;
  wherein moving a second slider along a second octet slider bar causes a third octet view area to change in correspondence to the first octet indicated by the first octet slider bar and a second octet indicated by the second octet slider bar; and
  wherein moving a third slider along a third octet slider bar causes a fourth octet view area to change in correspondence to the first octet indicated by the first octet slider bar, the second octet indicated by the second octet slider bar, and a third octet indicated by the third octet slider bar.

7. The graphical user interface of claim 1, wherein responsive to selecting an internet protocol range of the plurality of internet protocol ranges displayed in the control component, transferring the selected internet protocol range to the view manipulation component.

8. The graphical user interface of claim 1, wherein the octet slider bar for the each of the first three octet view area is generated sequentially by locking a previous specific octet to form the internet address space of the plurality of internet protocol ranges, wherein the previous specific octet is selected from a first octet and a second octet.

9. A computer program product comprising:
a computer recordable storage medium having computer usable program code for managing a plurality of internet protocol ranges, the computer program product comprising:
computer usable program code for displaying the plurality of internet protocol ranges;
computer usable program code for selecting either a one-dimensional or a two-dimensional graphical representation of a portion of the plurality of internet protocol ranges to form a selected graphical representation, wherein the graphical representation of the portion of the plurality internet protocol ranges is an enlarged version of the visual representation of the internet address space of the plurality of internet protocol ranges for providing additional details to a user;
computer usable program code for providing a visual representation of an internet address space of the plurality of internet protocol ranges, wherein the visual representation comprises:
  a plurality of octet view areas and an octet slider bar for each of a first three octet view areas; and
  a locking selector for locking the each of the first three octet view areas to a specific octet, wherein the octet slider bar is generated responsive to the specific octet being locked, and wherein the each of the first three octet view areas is removed from the visual representation responsive to the specific octet being locked; and
computer usable program code for displaying the selected graphical representation of the portion of the plurality of internet protocol ranges.

10. The computer program product of claim 9, wherein the computer usable program code for displaying the plurality of internet protocol ranges comprises computer useable program code for displaying the plurality of internet protocol ranges in a tree form.

11. The computer program product of claim 9, wherein the computer usable program code for providing the visual representation of the internet address space of the plurality of internet protocol ranges comprises computer usable program code for altering, by a user, a definition of an internet protocol range of the plurality of internet protocol ranges by a drag and drop method.

12. The computer program product of claim 9, wherein the computer usable program code for providing the visual representation of the internet address space of the plurality of internet protocol ranges comprises computer usable program code for editing, by a user, properties of an internet protocol range of the plurality of internet protocol ranges by clicking on a view manipulation area with a pointing device.

13. The computer program product of claim 9, further comprising:
  computer usable program code for moving a first slider along a first octet slider bar and causing a second octet view area in the plurality of octet view areas to change in correspondence to a first octet indicated by the first slider;
  computer usable program code for moving a second slider along the second octet slider bar and causing a third octet view area in the plurality of octet view areas to change in correspondence to the first octet indicated by the first octet slider bar and a second octet indicated by the second octet slider bar; and
  computer usable program code for moving a third slider along the third octet slider bar and causing a fourth octet view area in the plurality of octet view areas to change in correspondence to the first octet indicated by the first octet slider bar, the second octet indicated by the second octet slider bar, and a third octet indicated by the third octet slider bar.

14. The computer program product of claim 9, further comprising:

computer usable program code, responsive to selecting an internet protocol range of the plurality of internet protocol ranges displayed in the control component, for transferring the selected internet protocol range to a view manipulation area.

15. A computer implemented method for managing a plurality of internet protocol ranges, the computer implemented method comprising:
displaying the plurality of internet protocol ranges;
selecting either a one-dimensional or a two-dimensional graphical representation a portion of the plurality of internet protocol ranges to form a selected graphical representation;
generating a visual representation of an internet address space of the plurality of internet protocol ranges, wherein the graphical representation of the portion of the plurality internet protocol ranges is an enlarged version of the visual representation of the internet address space of the plurality of internet protocol ranges for providing additional details to a user;
responsive to selecting an internet protocol range of the displayed plurality of internet protocol ranges, generating a visual representation of the internet address space of the selected internet protocol range, wherein the visual representation comprises:
a plurality of octet view areas and an octet slider bar for each of a first three octet view areas; and
a locking selector for locking the each of the first three octet view areas to a specific octet, wherein the octet slider bar is generated responsive to the specific octet being locked, and wherein the each of the first three octet view areas is removed from the visual representation responsive to the specific octet being locked; and
displaying a graphical representation of the internet address space of the selected internet protocol range.

* * * * *